(12) United States Patent
Nagashima et al.

(10) Patent No.: US 7,920,014 B2
(45) Date of Patent: Apr. 5, 2011

(54) SEMICONDUCTOR INTEGRATED CIRCUIT DEVICE

(75) Inventors: Kazuhito Nagashima, Hitachinaka (JP); Takashi Muto, Hamura (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/427,308

(22) Filed: Apr. 21, 2009

(65) Prior Publication Data
US 2009/0261880 A1 Oct. 22, 2009

(30) Foreign Application Priority Data
Apr. 22, 2008 (JP) ................................. 2008-110834

(51) Int. Cl.
*H03K 17/56* (2006.01)
(52) U.S. Cl. ........... 327/423; 327/112; 327/87; 327/326
(58) Field of Classification Search .......... 327/108–112, 327/82–87, 326, 423
See application file for complete search history.

(56) References Cited

U.S. PATENT DOCUMENTS

| | | | | |
|---|---|---|---|---|
| 3,970,874 A * | 7/1976 | Kawasaki | ..................... | 327/392 |
| 5,739,707 A * | 4/1998 | Barraclough | ................. | 327/112 |
| 7,006,580 B2 * | 2/2006 | Haycock | ....................... | 375/296 |
| 7,196,557 B1 * | 3/2007 | Kwasniewski et al. | ....... | 327/108 |
| 7,352,211 B1 * | 4/2008 | De Araujo et al. | .............. | 326/86 |
| 7,528,635 B2 * | 5/2009 | Kwasniewski et al. | ....... | 327/108 |
| 7,557,615 B1 * | 7/2009 | Tran et al. | ....................... | 326/82 |
| 7,583,753 B2 * | 9/2009 | Okamura | ....................... | 375/296 |
| 7,667,502 B2 * | 2/2010 | Agarwal | ........................ | 327/108 |
| 7,696,787 B2 * | 4/2010 | De Araujo et al. | .............. | 326/86 |
| 2007/0205811 A1 * | 9/2007 | Nguyen | ........................ | 327/108 |
| 2008/0013645 A1 | 1/2008 | Muto et al. | | |
| 2009/0230993 A1 * | 9/2009 | Momtaz | ......................... | 326/83 |
| 2010/0117688 A1 * | 5/2010 | Lee et al. | ....................... | 327/108 |

FOREIGN PATENT DOCUMENTS

JP 2006-352374 A 12/2006
JP 2008-22392 A 1/2008

* cited by examiner

*Primary Examiner* — Lincoln Donovan
*Assistant Examiner* — Adam D Houston
(74) *Attorney, Agent, or Firm* — Miles & Stockbridge P.C.

(57) ABSTRACT

In order to transfer data at high speed over a long distance, a current mode logic output circuit (CML) having a large number of taps, high accuracy, and a wide switchable range of the amount of pre-emphasis is needed. However, when the amount of emphasis is set by adding unit source-coupled pair circuits, a problem will arise that the output capacitance of the current mode logic output circuit would increase, thus hampering high-speed transmission. An output circuit of the invention is constructed from unit source-coupled pair circuits 501, which are obtained by dividing a current mode logic output circuit (CML) into m groups, terminal resistors 502, and a data selector 504. The amount of emphasis of each tap is determined by the ratio of the number of unit source-coupled pair circuits, which have been obtained by dividing the CML into m groups, allocated to each tap. Thus, the amount of emphasis can be set to be any arbitrary amount without a change in the output amplitude of 1. As a result, the transmission speed can be increased and the transmission distance can be extended.

9 Claims, 8 Drawing Sheets

SEMICONDUCTOR INTEGRATED CIRCUIT DEVICE

CLAIM OF PRIORITY

The present application claims priority from Japanese patent application JP 2008-110834 filed on Apr. 22, 2008, the content of which is hereby incorporated by reference into this application.

BACKGROUND OF THE INVENTION

1. Field of the Invention

The present invention relates to semiconductor integrated circuit devices, and in particular to output circuits that are required to transfer data at high speed over a long distance.

2. Background Art

In recent years, there has been growing demand for accurate, high-speed data transfer with regard to data transfer between semiconductor devices over transmission lines. However, when data is transferred at a speed that is greater than or equal to the order of GHz, the waveform of the data will be attenuated after such data has passed through a transmission line.

FIG. 1 illustrates an example of the loss in a transmission line. The higher the frequency is, the greater the attenuation is. For example, in FIG. 1, a wave with a frequency of 1 GHz is attenuated by −11.2 dB. This means that when a sine wave with a voltage level of 1 V is transmitted, the wave will be attenuated to 0.274 V after it has passed through a transmission line. Meanwhile, a wave with a frequency of 2.5 GHz is attenuated by −21.4 dB. This means that when a sine wave with a voltage level of 1 V is transmitted, the wave will be attenuated to 0.085 V after it has passed through a transmission line.

FIGS. 2A to 2E illustrate examples of waveforms of data before and after having passed through transmission lines. In FIG. 2A, waves output from an output driver 201 pass through transmission lines 202, and then are received by a receiver 203. Outputs PAD204 monitor output waveforms, while inputs PAD205 monitor input waveforms.

FIG. 2B illustrates an example of an output waveform at the output PAD204. This is an example of a data string of 010000 in a 1-bit isolated pattern. A rectangular wave such as the one shown in FIG. 2B includes high-frequency components at the rising and falling edges.

FIG. 2C illustrates an example of a waveform at the input PAD205. The high-frequency components in the rising and falling edges of the output waveform shown in FIG. 2B are significantly attenuated after having passed through the transmission line and thus the waveform observed at the input PAD is not rectangular any more and is distorted because the amount of wave attenuation is greater as the frequency of the wave is higher as shown in FIG. 1. As a result, data '1' of a temporal region 206 in FIG. 2C adversely affects data '0' of adjacent temporal regions 207 and 208 as well as subsequent temporal regions 209, 210, and 211, thus disturbing the waveform. Such a phenomenon is called inter symbol interference (ISI). In high-speed data transfer, time in which a waveform is distorted accounts for a great part of the time required for transmission of 1 bit, thus becoming an obstacle to accurate data transfer. As a means for solving such problem with ISI, an output pre-emphasis technique has been known in which a '0' level and a '1' level of an amplitude of an output waveform are adjusted in advance so that data that has passed through a transmission line has a waveform that is as close as possible to a rectangular wave.

FIG. 2D illustrates an example of a pre-emphasized output waveform. In FIG. 2D, distortion of the waveform in FIG. 2C is taken into consideration in advance so that an amplitude corresponding to the data of '0' or '1' in FIG. 2B is output.

FIG. 2E illustrates the pre-emphasized output waveform of FIG. 2D after having passed through the transmission line. As the output pre-emphasis technique has been used, a waveform with small ISI is obtained.

Such an output pre-emphasis technique has been publicly known. For example, Reference 1 (JP Patent Publication (Kokai) No. 2006-352374 A) discloses an algorithm that determines the amplitude corresponding to the output data, namely, the amount of output pre-emphasis.

SUMMARY OF THE INVENTION

In order to transfer data at high speed over a long distance, it is necessary that the number of temporal regions, in which the adverse effect of inter symbol interference (ISI) is taken into consideration, be increased in determining the amount of emphasis. A temporal segment in which pre-emphasis is applied to a waveform so as to change the waveform is referred to as a "Tap." The amount of emphasis applied in transmission of data Dn to be transferred is determined based on the data Dn as well as the preceding and following data such as ..., Dn+2, Dn+1, Dn−1, Dn−2, and .... The amount of emphasis in each tap should be set with high accuracy.

The amount of emphasis of an output circuit should be set in accordance with the entire system configuration. When data is transferred at high speed over a long distance, the waveform of the data will be attenuated to a significant degree. Thus, the amount of emphasis in each tap should be set to be large. Meanwhile, the materials of the transmission lines also influence the amount of waveform attenuation to a significant degree. Thus, each tap should have a wide emphasis setting range.

Further, since the amount of wave attenuation of the entire system including transmission lines is expressed by a ratio relative to the entire amplitude, it is desirable that it be possible to set the amount of emphasis at a ratio relative to the entire amplitude. Meanwhile, an output circuit has an output capacitance as small as possible so that the bandwidth can be widened.

The present inventors studied a pre-emphasis output circuit shown in FIG. 3 prior to the present application. The output circuit includes a plurality of unit source-coupled pair circuits 301 and terminal resistors 302. In order to determine the amount of emphasis, it is necessary to use data on the output Dn as well as outputs that are transmitted at timings preceding and following the timing of the output Dn. Here, a shift register 303 is used as an example of generating such data. In FIG. 3, each unit source-coupled pair circuit 301 includes a pair of switching PMOS transistors 304 whose sources are coupled together and a current-source PMOS transistor 305. The current-source PMOS transistor is current-controlled by a control voltage 306. Output potentials are determined by currents flowing through the terminal resistors 302 and are output from an output terminal P electrode 307 and an output terminal N electrode 308.

In FIG. 3, a two-input NAND circuit 309 is used as an example in order to turn on or off each unit source-coupled pair circuit 301. When a selector control signal 310 is at a '0' level, '1' is applied to the gate of the switching PMOS transistor 305, whereupon the unit source-coupled pair circuit 301 is turned off. Meanwhile, when the selector control signal 310 is at a '1' level, Dn, Dn+1, or Dn−1 is validated, whereupon the unit source-coupled pair circuit 301 is turned on.

In the example of FIG. 3, a total of 10 unit source-coupled pair circuits are provided for the output Dn. Provided that the output amplitude in a case in which all of the 10 unit source-coupled pair circuits are turned on is 1, contribution of a single unit source-coupled pair circuit to the output is 0.1. In addition to the output Dn, the output Dn−1 transmitted at a timing preceding the timing of the output Dn, and the output Dn+1 transmitted at a timing following the timing of the output Dn, namely, three pieces of data constitute an output signal. Specifically, two unit source-coupled pair circuits are turned on by the Dn−1, six unit source-coupled pair circuits are turned on by the Dn, and two unit source-coupled pair circuits are turned on by the Dn+1.

In the output circuit shown in FIG. 3, the number of unit source-coupled pair circuits that constitute each tap should be increased by the number needed to realize the estimated maximum ratio. Such a circuit is problematic in that the circuit could have a high overhead, resulting in an increased output capacitance. In the example of the output circuit in FIG. 3, five unit source-coupled pair circuits have been added for the Dn−1 on the assumption that a maximum emphasis amount of 0.5 is set relative to an output amplitude of 1, and also five unit source-coupled pair circuits have been added for the Dn+1 on the assumption that a maximum emphasis amount of 0.5 is set relative to the output amplitude of 1. As a result, a total of 20 unit source-coupled pair circuits, which correspond to an output amplitude of 2, are added as the entire output circuit, whereby the output capacitance increases, thus hampering high-speed transmission.

In view of the foregoing, it is a problem of the present invention to realize an output circuit that has a small output capacitance and a wide switchable range of the amount of pre-emphasis, in order to perform high-speed, long-distance data transfer.

A representative brief overview of the invention disclosed in the present application is as follows. A semiconductor integrated circuit device is constructed from a data selector circuit that selects data to be transferred Dn as well as Dn+1, Dn+2, . . . , Dn−1, Dn−2, . . . and a current mode logic output circuit (CML) that determines the amount of output emphasis based on the data Dn, Dn+1, Dn+2, . . . , Dn−1, Dn−2 . . . .

The invention disclosed in the present application has the following representative advantageous effects. That is, an output circuit is realized that has a small output capacitance and a wide switchable range of the amount of pre-emphasis, whereby the transmission speed can be increased and the transmission distance can be extended.

DESCRIPTION OF SYMBOLS

Figure 1:
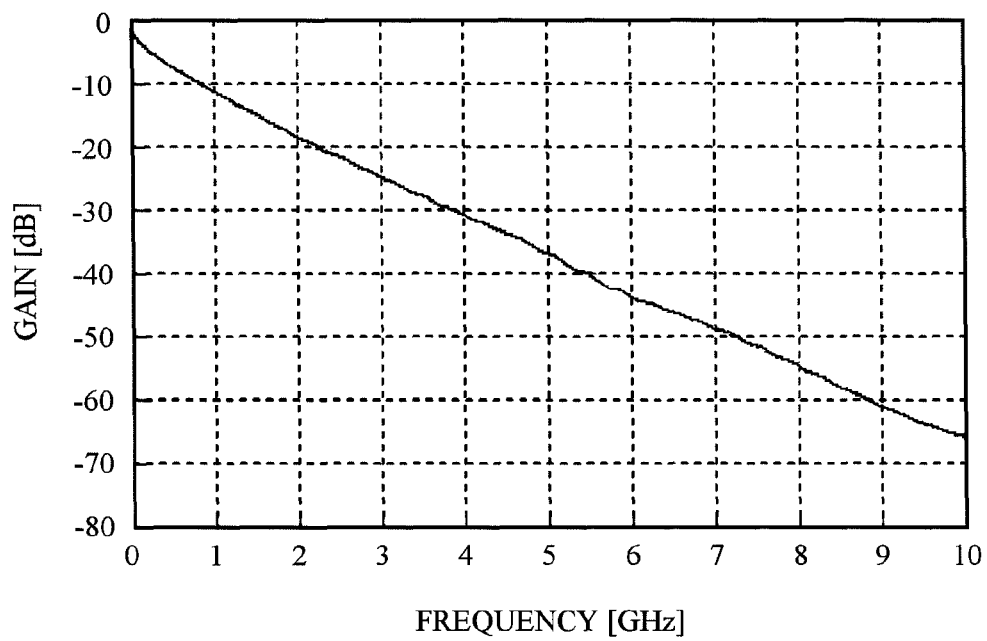
FIG. 1 illustrates the relationship between the frequency and attenuation of data that has passed through a transmission line.

201: output driver, 202: transmission line, 203: receiver, 204: output PAD, 205: input PAD, 206: temporal region of input data '1,' 207: temporal region of a transmission timing immediately before the region 206, 208: temporal region of a transmission timing immediately after the region 206, 209: temporal region of a transmission timing two regions after the region 206, 210: temporal region of a transmission timing three regions after the region 206, 211: temporal region of a transmission timing four regions after the region 206, 301: unit source-coupled pair circuit, 302: terminal resistor, 303: shift register, 304: switching PMOS transistor, 305: current-source PMOS transistor, 306: voltage for controlling the current-source PMOS transistor, 307: output terminal P electrode, 308: output terminal N electrode, 309: two-input NAND circuit, 310: selector control signal, 401; transmitter-side LSI, 402: receiver-side LSI, 403: transmission line, 404: transmitter-side serializer/deserializer, 405: low-speed parallel data, 406: high-speed serial data DATA, 407: transmitter-side phase locked loop, 408: multiplexer, 409: output driver, 410: clock CK, 411: receiver-side serializer/deserializer, 412: low-speed parallel data, 413: receiver-side phase locked loop, 414: receiver, 415: clock data recovery circuit, 416: demultiplexer, 417: clock CK, 418: high-speed serial data DATA, 501: unit source-coupled pair circuit, 502: terminal resistor, 503: shift register, 504: data selector, 505: switching PMOS transistor, 506: current-source PMOS transistor, 507: voltage for controlling the current-source PMOS transistor, 508: output terminal P electrode, 509: output terminal N electrode, 510: Dn/Dn−1 selector, 511: Dn/Dn+1 selector, 512: selector control signal, 513: selector control signal, 601: unit source-coupled pair circuit, 602: terminal resistor, 603: shift register, 604: data selector, 605: switching NMOS transistor, 606: current-source NMOS transistor, 607: voltage for controlling the current-source NMOS transistor, 608: output terminal P electrode, 609: output terminal N electrode, 610: Dn/Dn−1 selector, 611: Dn/Dn+1 selector, 612: selector control signal, 613: selector control signal, 701: unit source-coupled pair circuit, 702: terminal resistor, 703: shift register, 704: data selector, 705: Dn/Dn−1 selector, 706: Dn/Dn+1 selector, 707: selector control signal, 708: selector control signal, 709: switching PMOS transistor, 710: current-source PMOS transistor, 711: switching NMOS transistor, 712: current-source NMOS transistor, 713: voltage for controlling the current-source PMOS transistor, 714: voltage for controlling the current-source NMOS transistor, 715: output terminal P electrode, 716: output terminal N electrode, 801: unit source-coupled pair circuit, 802: terminal resistor, 803: shift register, 804: data selector, 805: selector control signal sel, 806: switching PMOS transistor, 807: current-source PMOS transistor, 808: current-source PMOS transistor, 809: output terminal P electrode, and 810: output terminal N electrode.

DESCRIPTION OF THE PREFERRED EMBODIMENTS

Figure 4:
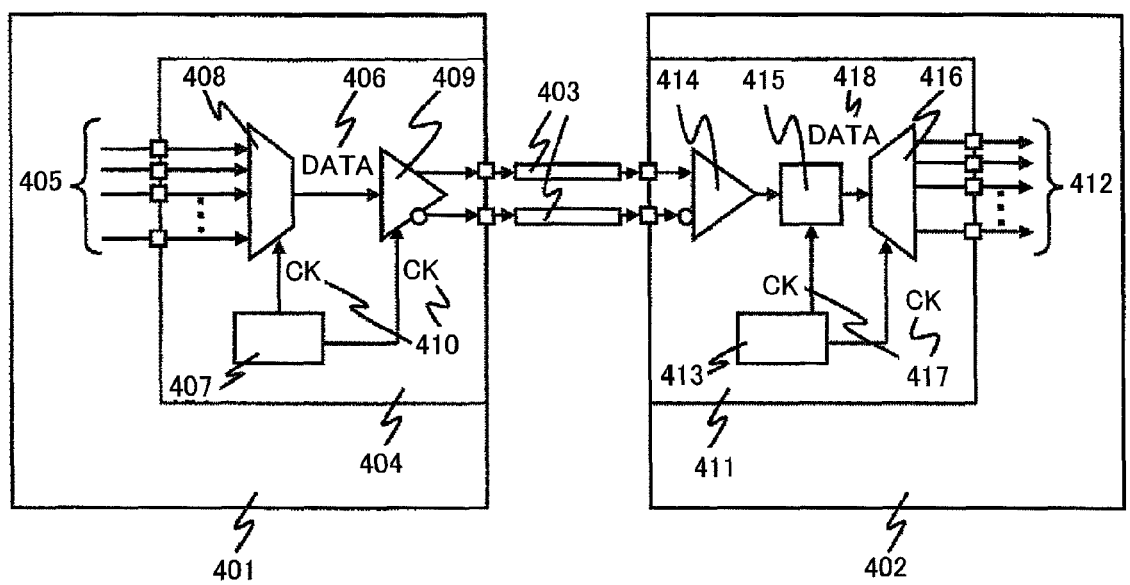
FIG. 4 illustrates an example of an input/output system for high-speed data transfer.

FIG. 4 illustrates an input/output system of a high-speed data transfer system. The input/output system of the high-speed data transfer system includes a transmitter-side LSI 401, a receiver-side LSI 402, and transmission lines 403.

A transmitter-side serializer/deserializer 404 is provided at the output of the transmitter-side LSI. The transmitter-side serializer/deserializer has a function of converting low-speed parallel data 405 within the LSI into high-speed serial data 406 (DATA) and outputting it to the outside.

The transmitter-side serializer/deserializer 404 includes a transmitter-side phase locked loop (PLL) 407, a multiplexer 408, and an output driver 409. The transmitter-side phase locked loop (PLL) 407 supplies high-speed clocks (CK) 410 to the multiplexer 408 and the output driver 409. The multiplexer 408, on the basis of the high-speed clock (CK) 410, converts the low-speed parallel data 405 into the high-speed serial data (DATA) 406. The output driver 409 outputs the high-speed serial data (DATA) 406.

A receiver-side serializer/deserializer (SerDes) 411 is provided at the input of the receiver-side LSI. The receiver-side serializer/deserializer has a function of accurately receiving the high-speed serial data input through the transmission lines 403, and converting it into low-speed parallel data 412.

The receiver-side serializer/deserializer (SerDes) includes a receiver-side phase locked loop (PLL) 413, a receiver 414, a clock data recovery circuit 415, and a demultiplexer 416. The receiver-side phase locked loop 413 supplies high-speed clocks (CK) 417 to the clock data recovery circuit (CDR) 415 and the demultiplexer 416. The receiver 414 amplifies the high-speed serial data input through the transmission lines 403. The clock data recovery circuit (CDR) 415 adjusts the phase relationship between the signal from the receiver 414 and the supplied high-speed clock (CK), and outputs accurate high-speed serial data (DATA) 418. The demultiplexer 416 converts the high-speed serial data (DATA) 418 into low-speed parallel data 412, and supplies it to the inside of the receiver-side LSI.

As described above, the low-speed data 405 in the transmitter-side LSI 401 is converted into high-speed serial data by the multiplexer 408 and is output to the outside of the LSI through the output driver 409. The output data is attenuated while it is passing through the transmission lines 403. The attenuated data is received by the input driver 414 and is output by the clock data recovery circuit (CDR) 415 as accurate high-speed serial data. Then, the data is converted into the low-speed parallel data 412 by the demultiplexer 416 and is supplied to the inside of the receiver-side LSI.

Figure 2A:
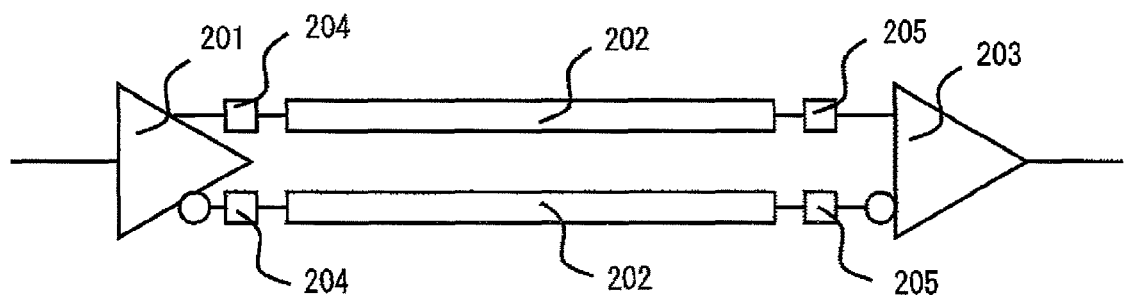
FIGS. 2A to 2E illustrate examples of waveforms of data before and after having passed through a transmission line.
Figure 2B:
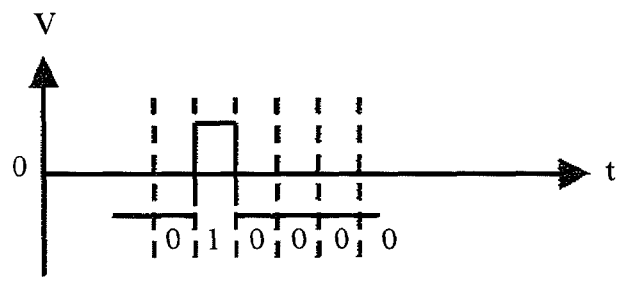
Figure 2C:
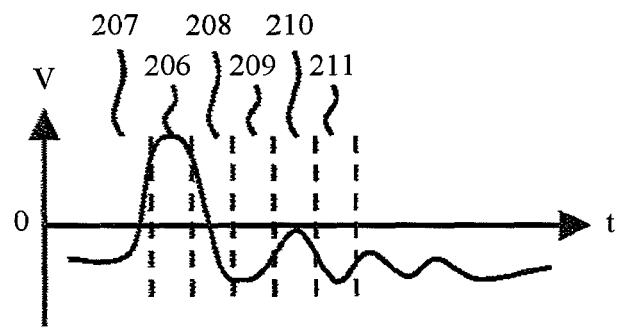
Figure 2D:
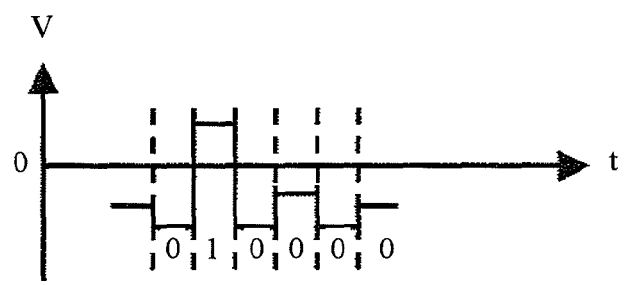
Figure 2E:
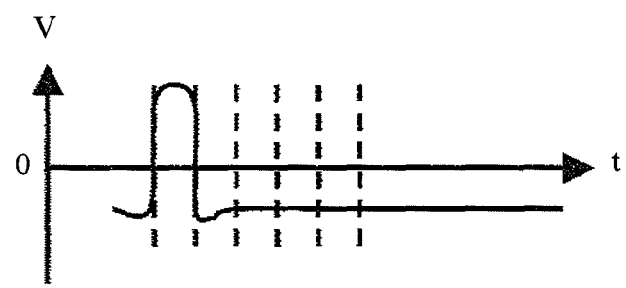
Figure 3:
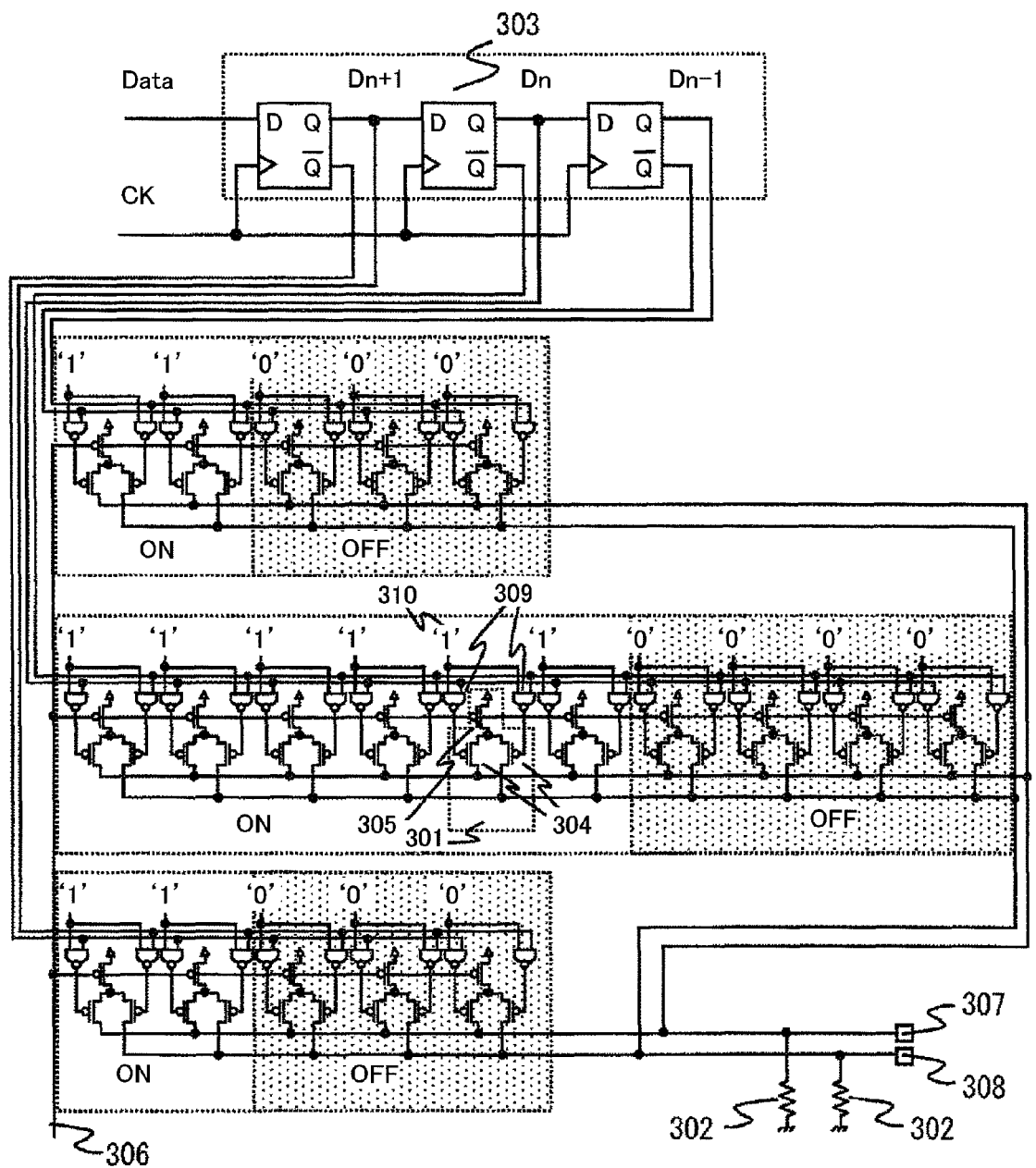
FIG. 3 is a pre-emphasis current mode logic output circuit (CML) that has been studied prior to the present invention.

Taking into consideration the attenuation of data transmitted through the transmission lines 403 in FIG. 4, the present invention provides an output driver with a pre-emphasis output shown in FIG. 2D.

Figure 5:
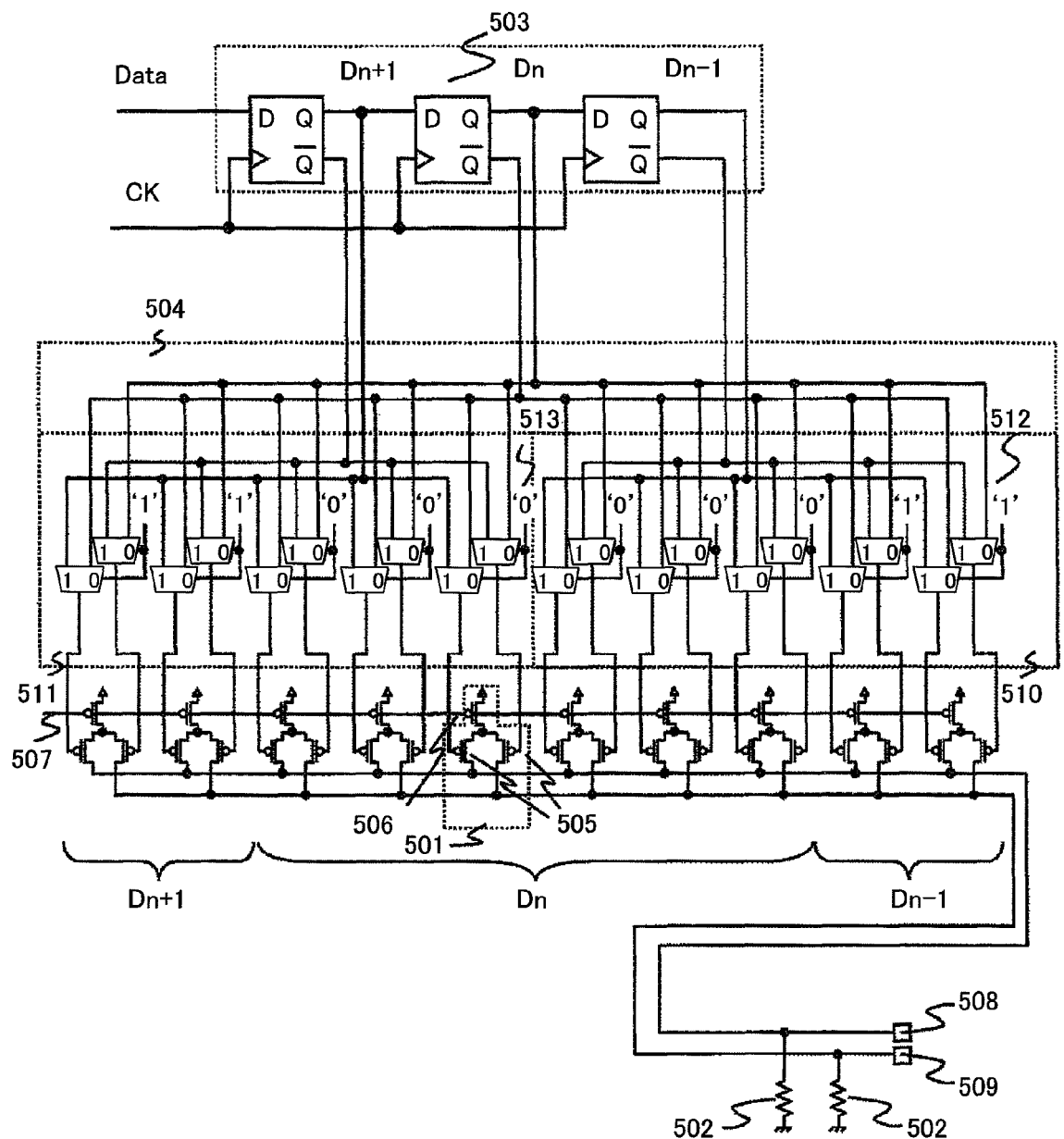
FIG. 5 illustrates a pre-emphasis current mode logic output circuit using a current mode logic (CML) with a ground potential (VSS) as a reference potential.

FIG. 5 illustrates a pre-emphasis current mode logic output circuit using a current mode logic (CML) with VSS as a reference potential. The circuit of FIG. 5 corresponds to the output driver 409 of FIG. 4.

The pre-emphasis circuit includes a shift register 503, a data selector 504, m unit source-coupled pair circuits 501, and terminal resistors 502. In order to determine the amount of emphasis for the output of the pre-emphasis circuit, it is necessary to use data on the output Dn as well as outputs that are transmitted at timings preceding and following the timing of the output Dn. Here, the shift register 503 is used as an example of generating such data.

The shift register 503 includes x flip-flops, and generates data on the output Dn as well as outputs that are transmitted at timings preceding and following the timing of the output Dn. Data is the data output from the LSI. A clock CK is a clock for driving the shift register. The frequency of the clock CK determines the transmission speed of data output from the pre-emphasis output circuit. In order to transfer data at high speed over a long distance, it is necessary to increase the number of temporal regions in which the adverse effect of ISI is taken into consideration, in determining the amount of emphasis. The amount of emphasis in a case in which the data to be transferred Dn is transmitted is determined based on the data Dn as well as the preceding and following data such as . . . , Dn+2, Dn+1, Dn−1, Dn−2, and . . . .

The data selector 504 includes a Dn/Dn−1 selector 510 and a Dn/Dn+1 selector 511. The Dn/Dn−1 selector 510 receives Dn and Dn−1 as input signals, selects one of either Dn or Dn−1 in response to a signal '0' or '1' of a selector control signal 512, and then outputs it.

The Dn/Dn+1 selector 511 receives Dn and Dn+1 as input signals, selects one of either Dn or Dn+1 in response to a signal '0' or '1' of a selector control signal 513, and then outputs it.

Each unit source-coupled pair circuit 501 includes a pair of switching PMOS transistors 505 whose sources are coupled together and a current-source PMOS transistor 506. The current-source PMOS transistor 506 is current-controlled by a control voltage 507. Output potentials output from an output terminal P electrode 508 and an output terminal N electrode 509 are determined by currents flowing through the terminal resistors 502.

Data Dn, Dn−1, and Dn+1 that are transmitted at different timings are generated from the Data via the shift register 503. The data Dn, Dn−1, and Dn+1 are selected by the Dn/Dn−1 selector 510 and the Dn/Dn+1 selector 511 so as to be input into the unit source-coupled pair circuits 501, and then are output from the output terminal P electrode 508 and the output terminal N electrode 509.

The output circuit of FIG. 5 has a circuit configuration in which the current mode logic output circuit (CML) is divided into m groups of source-coupled pairs and current sources, and each group is driven with a signal selected from among the consecutive data Dn+1, Dn, and Dn−1. FIG. 5 illustrates an example in which m=10. The Dn/Dn−1 selector 510 selects one of either Dn or Dn−1 in response to the selector control signal 512 and outputs it, while the Dn/Dn+1 selector 511 selects one of either Dn or Dn+1 in response to the selector control signal 513 and outputs it. Thus, each of the 10 unit source-coupled pair circuits is always driven with any one of the signals of Dn, Dn−1, and Dn+1. Thus, waveforms in which Dn, D−1, and Dn+1 are overlapped are output from the output terminal P electrode 508 and the output terminal N electrode 509. FIG. 5 illustrates an example in which two unit source-coupled pair circuits are driven by Dn−1, six unit source-coupled pair circuits are driven by Dn, and two unit source-coupled pair circuits are driven by Dn+1. For example, when a data string of '010' is to be output, that is, when '1' is to be output, Dn−1 will be '0,' Dn will be '1,' and Dn+1 will be '0.' Accordingly, '1' is output at an output level in which two '0,' six '1,' and two '0' are overlapped. That is, a pre-emphasized output is obtained.

Optimum values of the proportions of Dn, Dn−1, and Dn+1 that are to be overlapped with one another, namely, the amount of emphasis to be applied is calculated by, for example, simulating a system including the output driver 409, the transmission lines 403, and the input driver 414 shown in FIG. 4. Thus, it is necessary that the number of the unit source-coupled pair circuits included in each of the Dn/Dn−1 selector 510 and the Dn/Dn+1 selector 511 in FIG. 5 be set to be the estimated maximum number in order to accommodate all kinds of system configurations. In the example of FIG. 5, five unit source-coupled pair circuits are disposed in the Dn/Dn−1 selectors 510 on the assumption that a maximum emphasis amount of 0.5 is set relative to an output amplitude of 1, and five unit source-coupled pair circuits are disposed in the Dn/Dn+1 selectors 511 on the assumption that a maximum emphasis amount of 0.5 is set relative to an output amplitude of 1.

According to the present system, the output is divided into m groups. Thus, the unit source-coupled pair circuits can be implemented with the unchanged output amplitude of 1. In order to increase the accuracy of the amount of emphasis, it is only necessary to increase the number of divisions m. Thus, the system can be implemented with the unchanged output amplitude of 1. Further, even when the number of taps is increased, such circumstance can be addressed by allocating data of each tap and a selector of each Dn to each unit source-coupled pair circuit. Thus, the system can still be implemented with the unchanged amplitude of 1.

As described above, in FIG. 5, it is possible to construct a pre-emphasis output circuit with a large number of taps and high accuracy without an increase in output capacitance. Thus, the transmission speed can be increased and the transmission distance can be extended.

Figure 6:
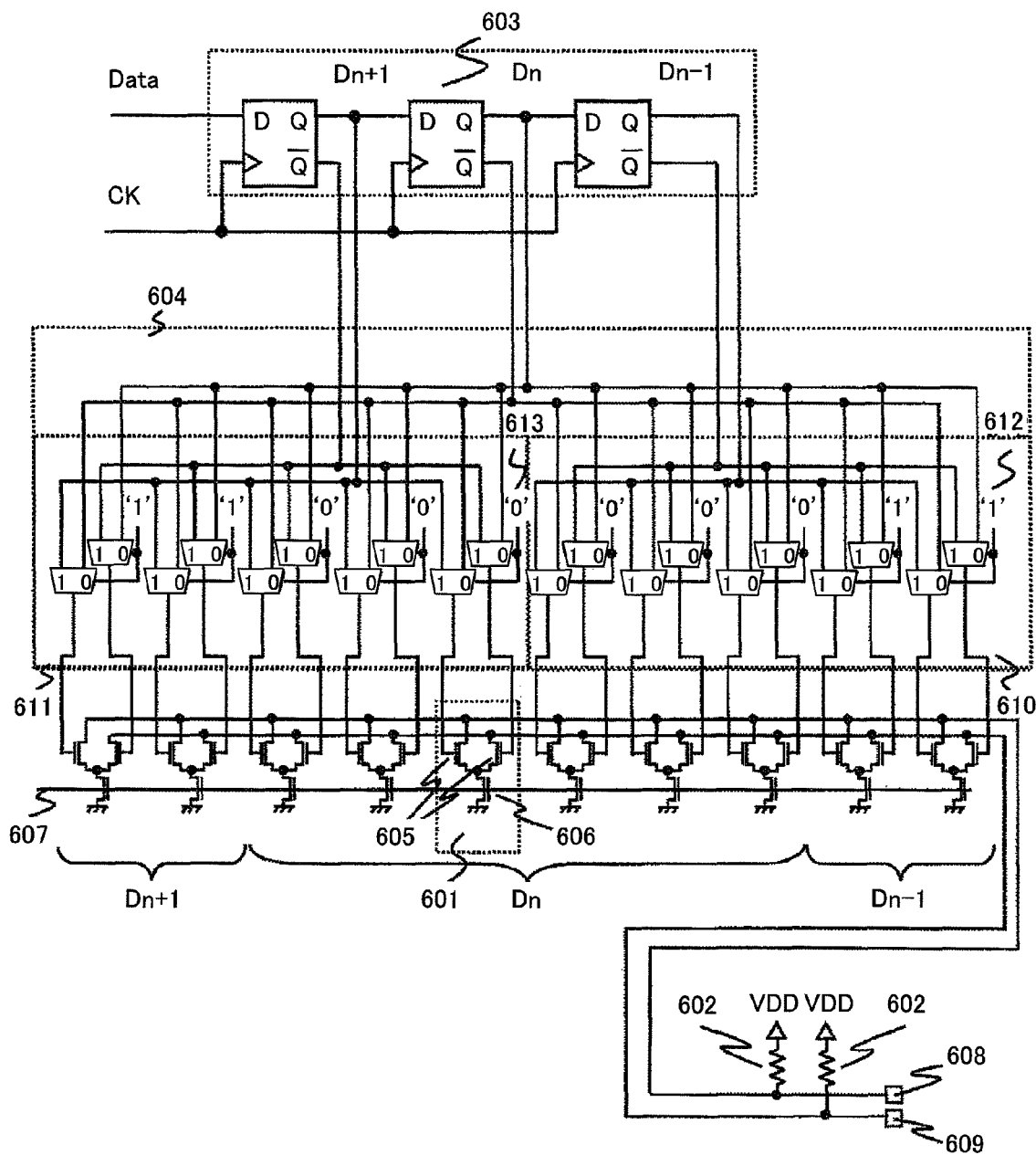
FIG. 6 illustrates a pre-emphasis current mode logic output circuit using a current mode logic (CML) with a power supply potential (VDD) as a reference potential.

FIG. 6 illustrates a pre-emphasis current mode logic (CML) output circuit using a current mode logic (CML) with VDD as a reference potential. The circuit of FIG. 6 corresponds to the output driver 409 of FIG. 4.

The pre-emphasis output circuit includes a shift register 603, a data selector 604, m unit source-coupled pair circuits 601, and terminal resistors 602. In order to determine the amount of emphasis for the output of the pre-emphasis output circuit, it is necessary to use data on the output Dn as well as outputs that are transmitted at timings preceding and following the timing of the output Dn. Here, the shift register 603 is used as an example of generating such data.

The shift register 603 includes x flip-flops, and generates data on the output Dn as well as outputs that are transmitted at timings preceding and following the timing of the output Dn. Data is the data output from the LSI. A clock CK is a clock for driving the shift register. The frequency of the clock CK determines the transmission speed of data output from the pre-emphasis output circuit.

The data selector 604 includes a Dn/Dn−1 selector 610 and a Dn/Dn+1 selector 611. The Dn/Dn−1 selector 610 receives Dn and Dn−1 as input signals, selects one of either Dn or Dn−1 in response to a signal '0' or '1' of a selector control signal 612, and then outputs it. The Dn/Dn+1 selector 611 receives Dn and Dn+1 as input signals, selects one of either Dn or Dn+1 in response to a signal '0' or '1' of a selector control signal 613, and then outputs it.

Each unit source-coupled pair circuit 601 includes a pair of switching NMOS transistors 605 whose sources are coupled together and a current-source NMOS transistor 606. The current-source NMOS transistor 606 is current-controlled by a control voltage 607. Output potentials output from an output terminal P electrode 608 and an output terminal N electrode 609 are determined by currents flowing through the terminal resistors 602. While the potentials output from the output terminal P electrode 508 and the output terminal N electrode 509 in FIG. 5 are based on VSS, potentials output from the output terminal P electrode 608 and the output terminal N electrode 609 in FIG. 6 are based on the power supply potential (VDD). For example, provided that VDD=1.2 V and amplitude=0.6 V, the output potential of FIG. 5 is in the range of 0 to 0.6 V, whereas the output potential of FIG. 6 is in the range of 0.6 to 1.2 V.

Data Dn, Dn−1, and Dn+1 that are transmitted at different timings are generated from the Data via the shift register 603. The data Dn, Dn−1, and Dn+1 are selected by the Dn/Dn−1 selector 610 and Dn/Dn+1 selector 611 so as to be input into the unit source-coupled pair circuits 601, and then are output from the output terminal P electrode 608 and the output terminal N electrode 609.

Similarly to FIG. 5, the output circuit of FIG. 6 has a circuit configuration in which the current mode logic output circuit (CML) is divided into m groups of source-coupled pairs and current sources, and each group is driven with a signal selected from data of each tap. In addition, since the Dn/Dn−1 selector 610 and the Dn/Dn+1 selector 611 are used as in FIG. 5, each of the m unit source-coupled pair circuits is always driven with any one of the signals of Dn, Dn−1, and Dn+1. Thus, it is also possible in FIG. 6 to set the amount of pre-emphasis to be any arbitrary amount without a change in the output amplitude of 1. Accordingly, it is also possible in FIG. 6 to construct a pre-emphasis output circuit having a large number of taps and high accuracy without an increase in output capacitance. Thus, the transmission speed can be increased and the transmission distance can be extended.

Figure 7:
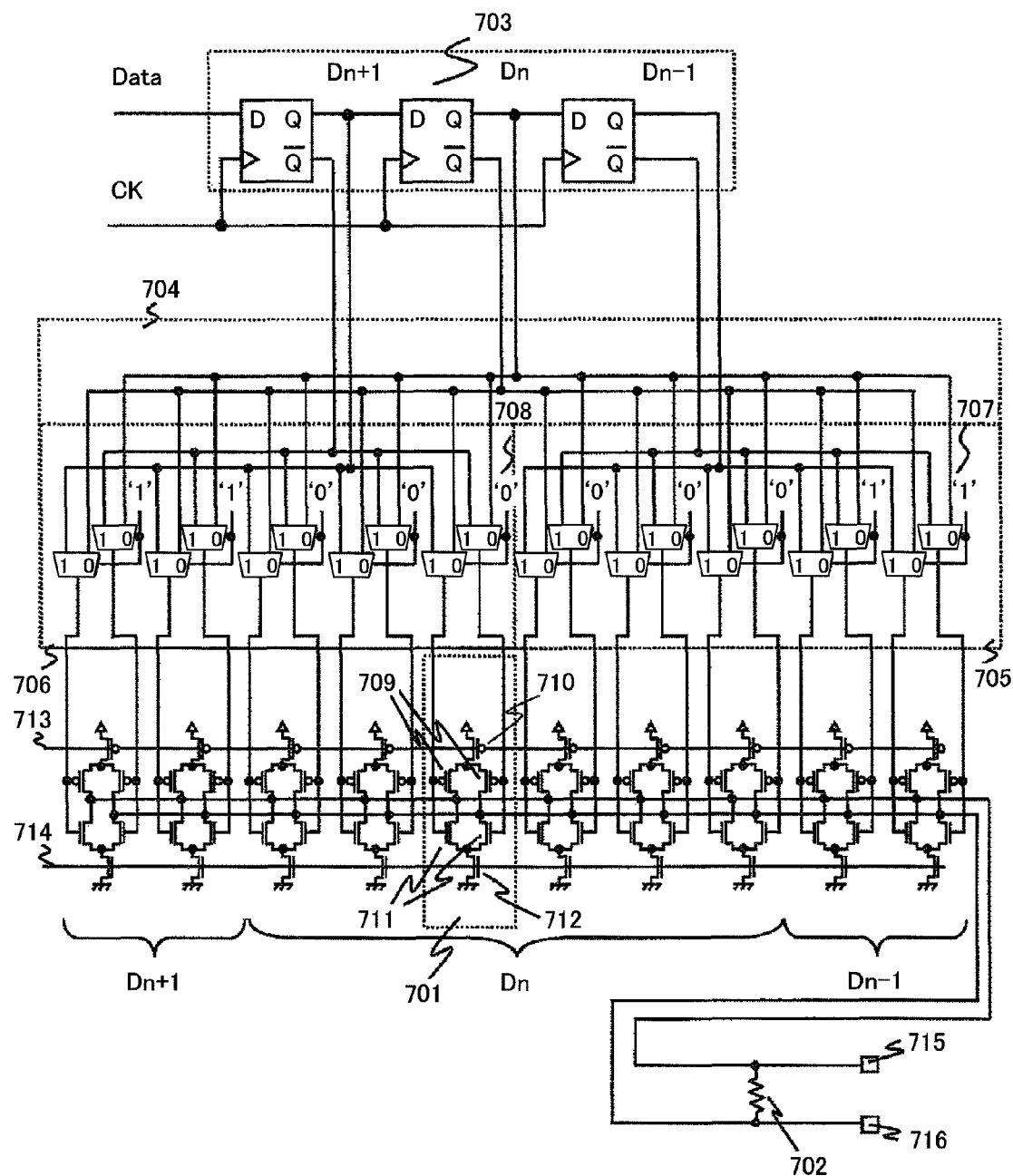
FIG. 7 illustrates a pre-emphasis current mode logic output circuit using a current-source PMOS transistor and a current-source NMOS transistor.

FIG. 7 illustrates a pre-emphasis current mode logic output circuit using a current-source PMOS transistor and a current-source NMOS transistor. The circuit of FIG. 7 corresponds to the output driver 409 of FIG. 4.

The pre-emphasis output circuit includes a shift register 703, a data selector 704, m unit source-coupled pair circuits 701, and a terminal resistor 702. In order to determine the amount of emphasis for the output of the pre-emphasis output circuit, it is necessary to use data on the output Dn as well as outputs that are transmitted at timings preceding and following the timing of the output Dn. Here, the shift register 703 is used as an example of generating such data.

The shift register 703 includes x flip-flops, and generates data on the output Dn as well as outputs that are transmitted at timings preceding and following the timing of the output Dn. Data is the data output from the LSI. A clock CK is a clock for driving the shift register. The frequency of the clock CK determines the transmission speed of data output from the pre-emphasis output circuit.

The data selector 704 includes a Dn/Dn−1 selector 705 and a Dn/Dn+1 selector 706. The Dn/Dn−1 selector 705 receives Dn and Dn−1 as input signals, selects one of either Dn or Dn−1 in response to a signal '0' or '1' of a selector control signal 707, and then outputs it.

The Dn/Dn+1 selector 706 receives Dn and Dn+1 as input signals, selects one of either Dn or Dn+1 in response to a signal '0' or '1' of a selector control signal 708, and then outputs it.

Each unit source-coupled pair circuit 701 includes a pair of switching PMOS transistors 709 whose sources are coupled together, a current-source PMOS transistor 710, a pair of switching NMOS transistors 711 whose sources are coupled together, and a current-source NMOS 712. The current-source PMOS transistor 710 is current-controlled by a control voltage 713, whereas the current-source NMOS transistor 712 is current-controlled by a control voltage 714. Output potentials output from an output terminal P electrode 715 and an output terminal N electrode 716 are determined by currents flowing through the terminal resistors 702. While the potentials output from the output terminal P electrode 508 and the output terminal N electrode 509 in FIG. 5 are based on VSS, potentials output from the output terminal P electrode 715 and the output terminal N electrode 716 in FIG. 7 can be set at potentials ranging from the power supply potential (VDD) to the ground potential (VSS). For example, provided that VDD=1.2 V and amplitude=0.6 V, the output potential of FIG. 5 is in the range of 0 to 0.6 V, whereas the output potential of FIG. 7 can be set in the range of 0.3 to 0.9 V by adjusting the control voltages 713 and 714.

Data Dn, Dn−1, and Dn+1 that are transmitted at different timings are generated from the Data via the shift register 703. The data Dn, Dn−1, and Dn+1 are selected by the Dn/Dn−1 selector 705 and the Dn/Dn+1 selector 706 so as to be input into the unit source-coupled pair circuits 701, and then are output from the output terminal P electrode 715 and the output terminal N electrode 716.

Similarly to FIG. 5, the output circuit of FIG. 7 has a circuit configuration in which the current mode logic output circuit (CML) is divided into m groups of source-coupled pairs and current sources, and each group is driven with a signal selected from data of each tap. In addition, since the Dn/Dn−1 selector 705 and the Dn/Dn+1 selector 706 are used as in FIG. 5, each of the m unit source-coupled pair circuits is always driven with any one of the signals of Dn, Dn−1, and Dn+1. Thus, it is also possible in FIG. 7 to set the amount of pre-emphasis to be any arbitrary amount without a change in the output amplitude of 1. Accordingly, it is also possible in FIG. 7 to construct a pre-emphasis output circuit having a large number of taps and high accuracy without an increase in output capacitance. Thus, the transmission speed can be increased and the transmission distance can be extended.

Figure 8:
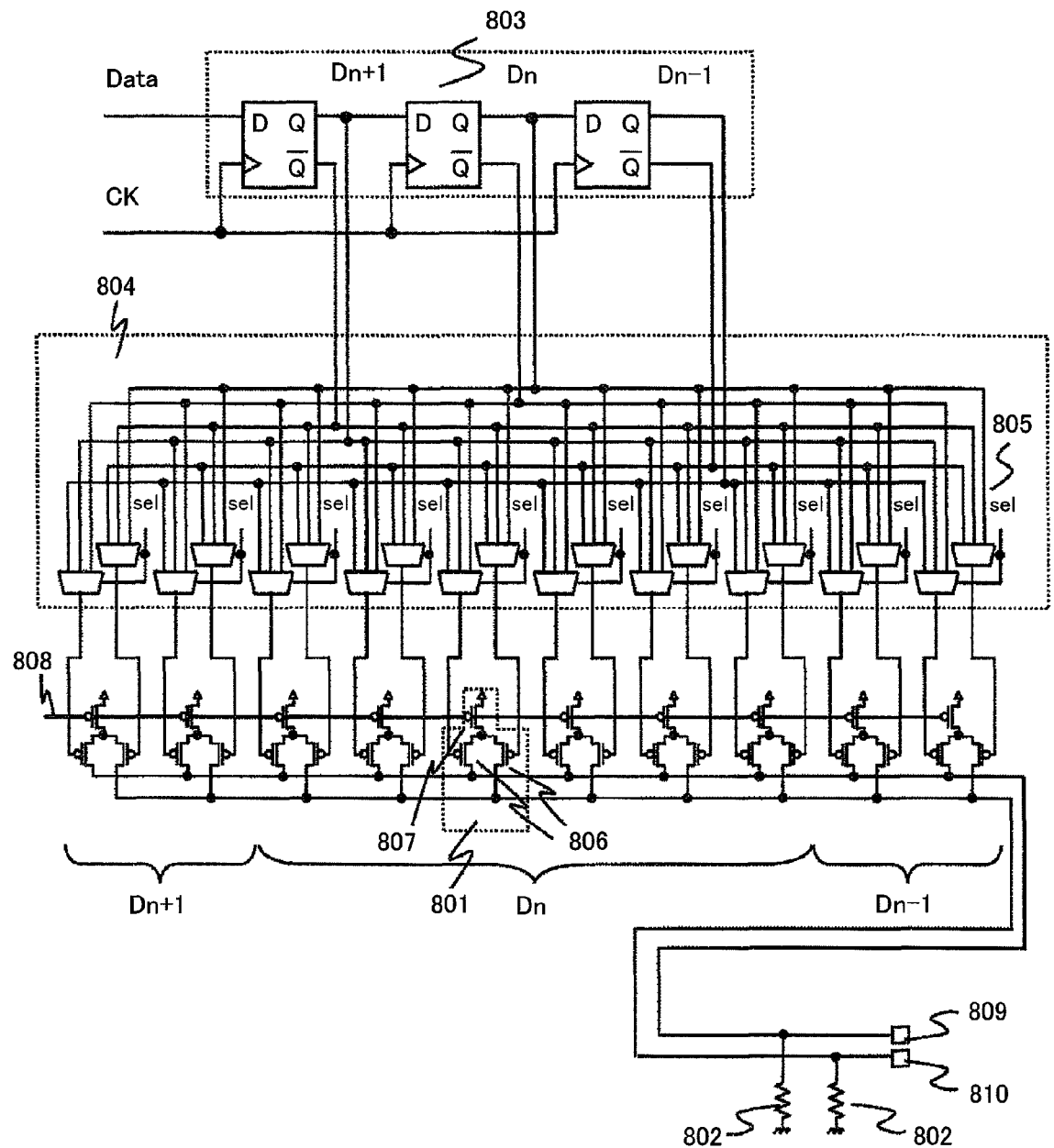
FIG. 8 illustrates a pre-emphasis current mode logic output circuit using a multi-input selector circuit.

FIG. 8 illustrates a pre-emphasis CML output circuit using a multi-input selector circuit. The circuit of FIG. 8 corresponds to the output driver 409 of FIG. 4.

The pre-emphasis output circuit includes a shift register 803, a data selector 804, m unit source-coupled pair circuits 801, and terminal resistors 802. In order to determine the amount of emphasis for the output of the pre-emphasis output circuit, it is necessary to use data on the output Dn as well as outputs that are transmitted at timings preceding and following the timing of the output Dn. Here, the shift register 803 is used as an example of generating such data.

The shift register 803 includes x flip-flops, and generates data on the output Dn as well as outputs that are transmitted at timings preceding and following the timing of the output Dn. Data is the data output from the LSI. A clock CK is a clock for driving the shift register. The frequency of the clock CK determines the transmission speed of data output from the pre-emphasis output circuit.

The data selector 804 receives Dn, Dn−1, and Dn+1 as input signals, selects one of Dn, Dn−1, and Dn+1 in response to a selector control signal sel 805, and then outputs it. The data selector 804 has multiple inputs and thus it differs from the data selector 504 with two inputs shown in FIG. 5. The data selector 804 has a larger circuit scale in comparison with the data selector 504, and thus has an overhead of delay and areas. However, it has the advantage that as the number of taps that can be selected increases, the design flexibility in setting the emphasis ratio also increases.

Each unit source-coupled pair circuit 801 includes a pair of switching PMOS transistors 806 whose sources are coupled together and a current-source PMOS transistor 807. The current-source PMOS transistor 807 is current-controlled by a control voltage 808. Output potentials output from an output terminal P electrode 809 and an output terminal N electrode 810 are determined by currents flowing through the terminal resistors 802.

Data Dn, Dn−1, and Dn+1 that are transmitted at different timings are generated from the Data via the shift register 803. The data Dn, Dn−1, and Dn+1 are selected by the data selector 804 so as to be input into the unit source-coupled pair circuits 801, and then are output from the output terminal P electrode 809 and the output terminal N electrode 810.

Similarly to FIG. 5, the output circuit of FIG. 8 has a circuit configuration in which the current mode logic output circuit (CML) is divided into m groups of source-coupled pairs and current sources, and each group is driven with a signal selected from data of each tap. In addition, since the data selector 804 is used as in FIG. 5, each of the m unit source-coupled pair circuits is always driven with any one of the signals of Dn, Dn−1, and Dn+1. Thus, it is also possible in FIG. 8 to set the amount of pre-emphasis to be any arbitrary amount without a change in the output amplitude of 1. Accordingly, it is also possible in FIG. 8 to construct a pre-emphasis output circuit having a large number of taps and high accuracy without an increase in output capacitance. Thus, the transmission speed can be increased and the transmission distance can be extended.

Although the invention made by the present inventors has been specifically described with reference to the embodiments, it should be appreciated that the invention is not to be construed as being limited to such embodiments and various modifications and variations can be made to the invention without departing from the spirit and scope thereof.

What is claimed is:

1. A semiconductor integrated circuit device comprising a plurality of unit source-coupled pair circuits and a plurality of selectors, wherein
    each unit source-coupled pair circuit includes a current-source MOS transistor functioning as a current source and a pair of MOS transistors,
    the sources of the pair of MOS transistors are connected to the drain of the current source, and the drains of the pair of MOS transistors are connected to a first output terminal and a second output terminal, respectively,
    each selector selects one of consecutive pieces of data and outputs the selected data to the gate of one of the pair of MOS transistors, and
    wherein the first and second output terminals are connected to transmission lines.

2. The semiconductor integrated circuit device according to claim 1, further comprising a shift register, wherein
    the consecutive pieces of data are input to the shift register in synchronization with a clock, and
    each selector selects one of the consecutive pieces of data output from each flip-flop of the shift register, and outputs the selected data to the gate of one of the pair of MOS transistors.

3. The semiconductor integrated circuit device comprising a plurality of unit source-coupled pair circuits and a plurality of selectors, wherein
    each unit source-coupled pair circuit includes a current-source MOS transistor functioning as a current source and a pair of MOS transistors,
    the sources of the pair of MOS transistors are connected to the drain of the current source, and the drains of the pair of MOS transistors are connected to a first output terminal and a second output terminal, respectively,
    each selector selects one of consecutive pieces of data and outputs the selected data to the gate of one of the pair of MOS transistors, and
    the current-source MOS transistor and the pair of MOS transistors are PMOS transistors, and the first and second output terminals are grounded through resistors.

4. The semiconductor integrated circuit device according to claim 1, wherein the current-source MOS transistor and the pair of MOS transistors are NMOS transistors, and the first and second output terminals are connected to a power supply through resistors.

5. The semiconductor integrated circuit device according to claim 2, wherein the consecutive pieces of data are input to the shift register through a multiplexer.

6. A semiconductor integrated circuit device comprising a plurality of unit source-coupled pair circuits and a plurality of selectors, wherein
- each unit source-coupled pair circuit includes a first current-source MOS transistor functioning as a first current source, a second current-source MOS transistor functioning as a second current source, a first pair of MOS transistors, and a second pair of MOS transistors,
- the sources of the first pair of MOS transistors are connected to the drain of the first current source, the sources of the second pair of MOS transistors are connected to the drain of the second current source, the drains of the first pair of MOS transistors are connected to a first output terminal and a second output terminal, respectively, and the drains of the second pair of MOS transistors are connected to the first output terminal and the second output terminal, respectively, and
- each selector selects one of consecutive pieces of data and outputs the selected data to the gate of one of the first pair of MOS transistors and to the gate of one of the second pair of MOS transistors.

7. The semiconductor integrated circuit device according to claim 6, further comprising a shift register, wherein
- the consecutive pieces of data are input to the shift register in synchronization with a clock, and
- each selector selects one of the consecutive pieces of data output from each flip-flop of the shift register, and outputs the selected data to the gate of one of the first pair of MOS transistors and to the gate of one of the second pair of MOS transistors.

8. The semiconductor integrated circuit device according to claim 7, wherein the consecutive pieces of data are input to the shift register through a multiplexer.

9. The semiconductor integrated circuit device according to claim 6, wherein the first and second output terminals are connected to transmission lines.

* * * * *